Sept. 11, 1923.
H. B. KNAP
MOTOR VEHICLE
Filed March 3, 1919
1,467,939
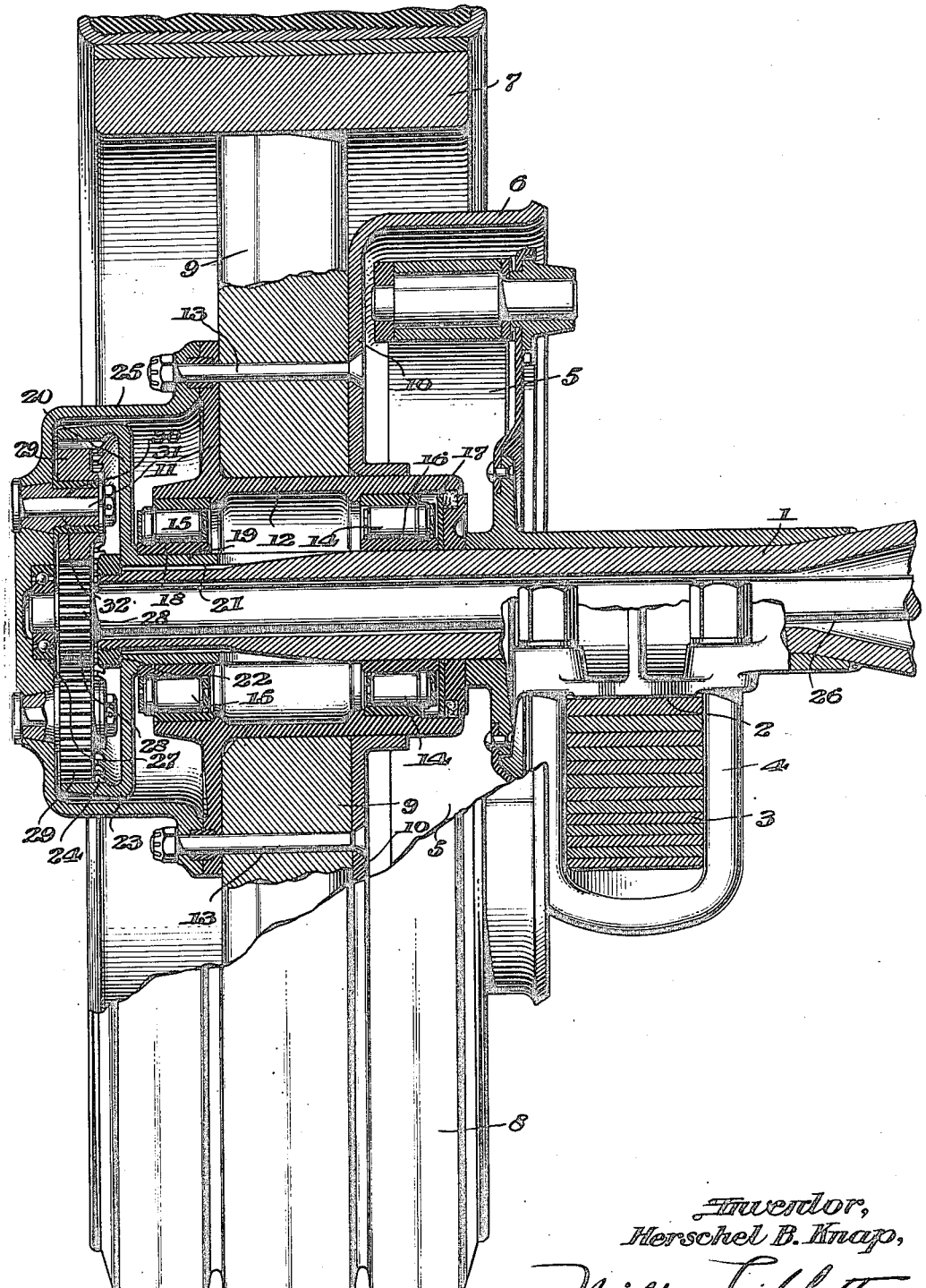
Inventor,
Herschel B. Knap,
By Milton Tibbetts
Atty.

Patented Sept. 11, 1923.

1,467,939

UNITED STATES PATENT OFFICE.

HERSCHEL B. KNAP, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed March 3, 1919. Serial No. 280,368.

*To all whom it may concern:*

Be it known that I, HERSCHEL B. KNAP, a citizen of the United States, and resident of Detroit, Wayne County, State of Michigan, have invented certain new and useful Improvements in Motor Vehicles, of which the following is a specification.

This invention relates to motor vehicles and particularly to the axle and wheel construction. One of the objects of the invention is to provide a sturdy axle construction which embodies a reduction gearing in or at the wheel.

Another object of the invention is to provide a planetary type of gear reduction in the wheel hub or at the end of the axle.

Another object of the invention is to provide an axle and wheel construction in which the wheel is mounted in separated bearings on the axle and is driven through a reduction gearing at the end of the axle, with the driving shaft passing through the axle.

Another object of the invention is to provide an axle and wheel construction in which the wheel is mounted upon the axle and the reduction gears are arranged in the hub of the wheel, so formed that the gears may be readily accessible and removable without disturbing the wheel.

Other objects of the invention will appear from the following description taken in connection with the drawing in which the figure is a vertical section and part elevation through the outer end of a motor vehicle axle and wheel.

Referring to the drawings, 1 is an axle or supporting member shown in the form of a tube. Secured to this axle member is a spring pad 2 and a spring 3 is clamped by bolts 4 to the spring pad. Also mounted upon the spring pad are brake shoes 5 adapted to cooperate with a brake drum 6 on a wheel 7.

The wheel 7 is of the type used on commercial vehicles. It is built very heavy and is shown as provided with solid rubber tires 8. The spokes 9 of the wheel are mounted between the plate portion 10 of the brake drum 6 and the plate portion 11 of a hub member 12 as by bolts 13. The hub member 12 surrounds the outer end of the axle member 1 and is supported thereon by a pair of separated bearings 14 and 15, the bearings shown being of the roller type. The inner race 16 of the bearing 14 abuts against a two-piece plate 17 which rests against the outer end of the spring pad 2 thus taking the inward thrust on the bearing 14. The inner race 18 of the bearing 15 rests directly upon the hub 19 of a gear member 20, which member is keyed to the outer end of the axle as shown at 21 and retained thereon by a nut 22. Thus the outward end thrust of the wheel is taken on this nut 22 through the member 20.

The member 20 above referred to has a peripheral and outwardly extending flange 23 upon which is formed an internal spur gear 24, and this entire member is surrounded by an outer hub member or hub cap 25, which is secured to the wheel by the bolts 13 above referred to. This outer hub member 25 also forms a housing for the outer end of the axle.

Extending through the tubular axle member 1, is a driving shaft 26, which shaft extends from the differential in the middle of the axle (which differential is not shown in the drawing but is of the usual type) to and through the outer end of the axle and has a bearing in the hub member 25 as at 27. This bearing and the inner bearing of the shaft in the differential permits the shaft 26 to rotate concentrically with the wheel 7. The shaft 26 is formed at its outer end with a spur pinion 28, which is concentric with and in the plane of the internal gear 24 above referred to.

Arranged in the outer hub member 25, between the pinion 28 and the intermediate gear 24, is an intermediate gear 29. This gear is mounted on a spindle 30, suitably secured to the member 25 as by a through bolt 31 and nut 32. There may be one or more of these pinions 29, two of them being shown in the present illustration to thereby divide the driving load from the pinion 28 to the gear 24.

It will be understood from the above description that the rotation of the driving shaft 26 will cause a planetary action through the gears 29 and 24 to thereby rotate the hub member 25 and with it the entire wheel 7 at a reduced ratio and in the same direction of travel as the shaft 26.

It will also be seen that the gears are readily dismounted without disturbing the wheel itself. This dismounting may be done by removing the nuts or bolts 13 and withdrawing the outer hub member 25. With this member will come the gears 29. Then the shaft 26 may be withdrawn from the axle member 1. The axle may be further dismounted by taking off the nut 22 and withdrawing the gear member 20. This permits the removal of the entire wheel. The parts may be assembled by the reverse operation.

Other forms than those described may be used without departing from the spirit or scope of the invention.

Having thus described my invention, what I claim and desire to secure by Letters Patent is:

1. In axle and wheel construction, the combination with a tubular supporting member, and an internal gear mounted thereon, of a wheel wholly supported on separated bearings on said member and having a hub extending over the end of said supporting member, a driving shaft extending through said member and having a pinion, a bearing for the shaft in the wheel hub, and a gear supported by the wheel in mesh with said pinion and gear.

2. In axle and wheel construction, the combination with a tubular supporting member, and an internal gear mounted thereon, of a wheel having bearings wholly supporting it on said member inside of said gear and having a hub extending over said gear and over the end of said member, a driving shaft extending through said member and having a pinion in the plane of said gear, a bearing in the wheel hub for said shaft, and a gear supported by the wheel hub in mesh with said pinion and internal gear.

3. In axle and wheel construction, the combination with a tubular axle member and an internal gear mounted at the end thereof, of a wheel wholly supported on separated bearings on said axle member inside of said gear, said wheel having a hub part extending over the gear and the end of the axle member, a driving shaft extending through the axle member and having a bearing in the wheel hub concentric with the wheel bearings, said shaft having a pinion, and a gear supported by the wheel in mesh with said pinion and said internal gear.

4. In axle and wheel construction, the combination with a tubular axle member and an internal gear extending beyond the end thereof and having a hub keyed to said axle member, of a wheel having separated bearings, one mounted on said gear hub and the other directly on said axle member, said wheel having a hub part covering the end of the axle member and said internal gear, a driving shaft projecting from the end of said axle member and having a pinion thereon, and a gear supported in the wheel hub in mesh with said pinion.

5. In axle and wheel construction, the combination with a tubular axle member and a wheel mounted on bearings carried by said member so that the wheel is wholly supported on the axle member, a gear carried by the end of the axle member, an axle section extending through said axle member, a gear secured to the end of said axle section, an outer hub member secured to said wheel and having a bearing for the end of said axle section, and gearing enclosed within and carried by said outer hub member for connecting the gear on the axle section with said first mentioned gear.

6. In axle and wheel construction, the combination with a tubular axle member, a wheel having a hub member mounted on separated bearings carried by the axle member, an internal gear carried by the end of the axle member, an axle section extending through said axle member, a gear secured to the end of the axle section, an outer hub member secured to the first named hub member and having a bearing for said axle section, and gearing enclosed within and carried by said outer hub member for connecting the gear on the axle section to said internal gear.

7. In axle and wheel construction, the combination with a tubular axle member, a wheel having a hub member mounted on separated bearings carried by the axle member, an internal gear carried by the end of the axle member, an axle section extending through said axle member, a gear secured to the end of the axle section, an outer hub member secured to the first named hub member and having a bearing for said axle section, and planetary gearing enclosed within and carried by said outer hub member for connecting the gear on the axle section to said internal gear.

In testimony whereof I affix my signature.

HERSCHEL B. KNAP.